United States Patent [19]

Hovagimyan et al.

[11] 3,832,495

[45] Aug. 27, 1974

[54] INFORMATION TRANSFER SYSTEM FOR A PBX

[75] Inventors: Norman Hovagimyan; Murray Rosenblatt, both of Cherry Hill, N.J.

[73] Assignee: RCA Corporation, New York, N.Y.

[22] Filed: Dec. 18, 1972

[21] Appl. No.: 315,894

[52] U.S. Cl. ........................ 179/18 GF, 179/18 AD

[51] Int. Cl. ............................................ H04q 3/50

[58] Field of Search........ 179/18 FG, 18 FF, 18 GF, 179/18 AB, 18 AD

[56] References Cited

UNITED STATES PATENTS

| | | | |
|---|---|---|---|
| 3,073,907 | 1/1963 | Alterman et al. | 179/18 FG |
| 3,513,263 | 5/1970 | Bastian et al. | 179/18 AD X |
| 3,618,024 | 11/1971 | Leger et al. | 179/18 GF X |
| 3,737,587 | 6/1973 | Romero | 179/18 B |

*Primary Examiner*—Thomas W. Brown
*Attorney, Agent, or Firm*—Edward J. Norton; Joseph S. Tripoli

[57] ABSTRACT

In a private telephone branch exchange, including a crosspoint switching matrix, a system for transferring non-verbal control information such as: dial pulse information: camp-on information: and message complete information. The control information is transferred between utilization devices, such as line circuits and registers, over a path which is external to the switching matrix.

10 Claims, 2 Drawing Figures

INFORMATION TRANSFER SYSTEM FOR A PBX

Figure 1:
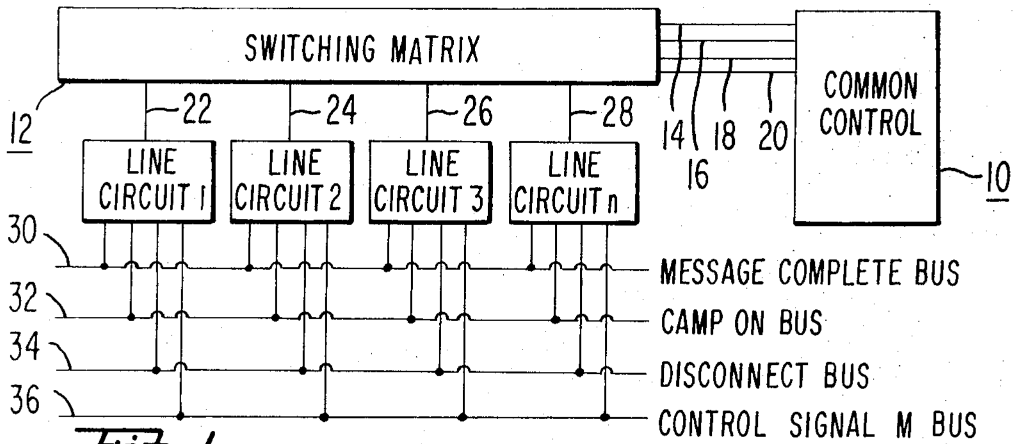

The present invention relates generally to switching systems and more specifically to switching systems in the context of a telephonic private branch exchange (PBX).

In PBX systems there is generally a requirement for transferring non-verbal control information signals between certain utilization devices which are connected to a switching matrix. The transfer of control information may be between line circuits, or between trunk circuits and line circuits, between line circuits and registers, etc. In the subsequent discussion and illustration only line circuits will be shown as utilization devices although it will be understood that they can be any variation of utilization devices or circuits of different types. The types of control signals to be transferred may be dial pulse information, disconnect information, camp-on information, message complete information or any other similar, non-verbal control type of information.

There are primarily two prior art approaches to this information transfer problem in the PBX art.

The first solution entails the utilization of additional contacts at each crosspoint in the switching matrix. The problem with this solution is that it tends to make the switching matrix larger.

The second prior art approach involves the use of a common mode path to transfer the information. For example, a path, sometimes referred to as a phantom path, is established between the center taps of two transformers. Each transformer is located in a separate line circuit. The control signals are then passed over the common mode path. One problem with the common mode path is that the speed of information transfer is often limited by the audio transformers and circuits. Also, since only a single common mode path is available, it is costly to transfer more than one type of signal over it. In addition, the audio signals are distorted to a certain extent, especially when the crosspoint switches are of the solid state variety. The control signals may vary the effective resistance across the crosspoint and in this manner tend to distort the audio path through the switching matrix.

The present invention provides a system for transferring control information between utilization devices without affecting the size of the switching matrix or distorting the audio paths through the matrix.

In accordance with the present invention, there is provided in a PBX a system comprising: a common control means; a crosspoint switching matrix; a plurality of utilization devices; and at least one information bus external to the switching matrix. Certain groups of switches in the matrix are included in links through the switching matrix. The utilization devices are coupled to the matrix and at least one information bus has a connection to each of the utilization devices. The system also comprises a means for providing a strobing signal at certain times to particular ones of the utilization devices for indicating the existence of a connection between the particular ones of the utilization devices and a particular link in the matrix. There is also provided a means responsive to the strobing signals for transferring information between the particular utilization devices over the at least one information bus.

Figure 2:
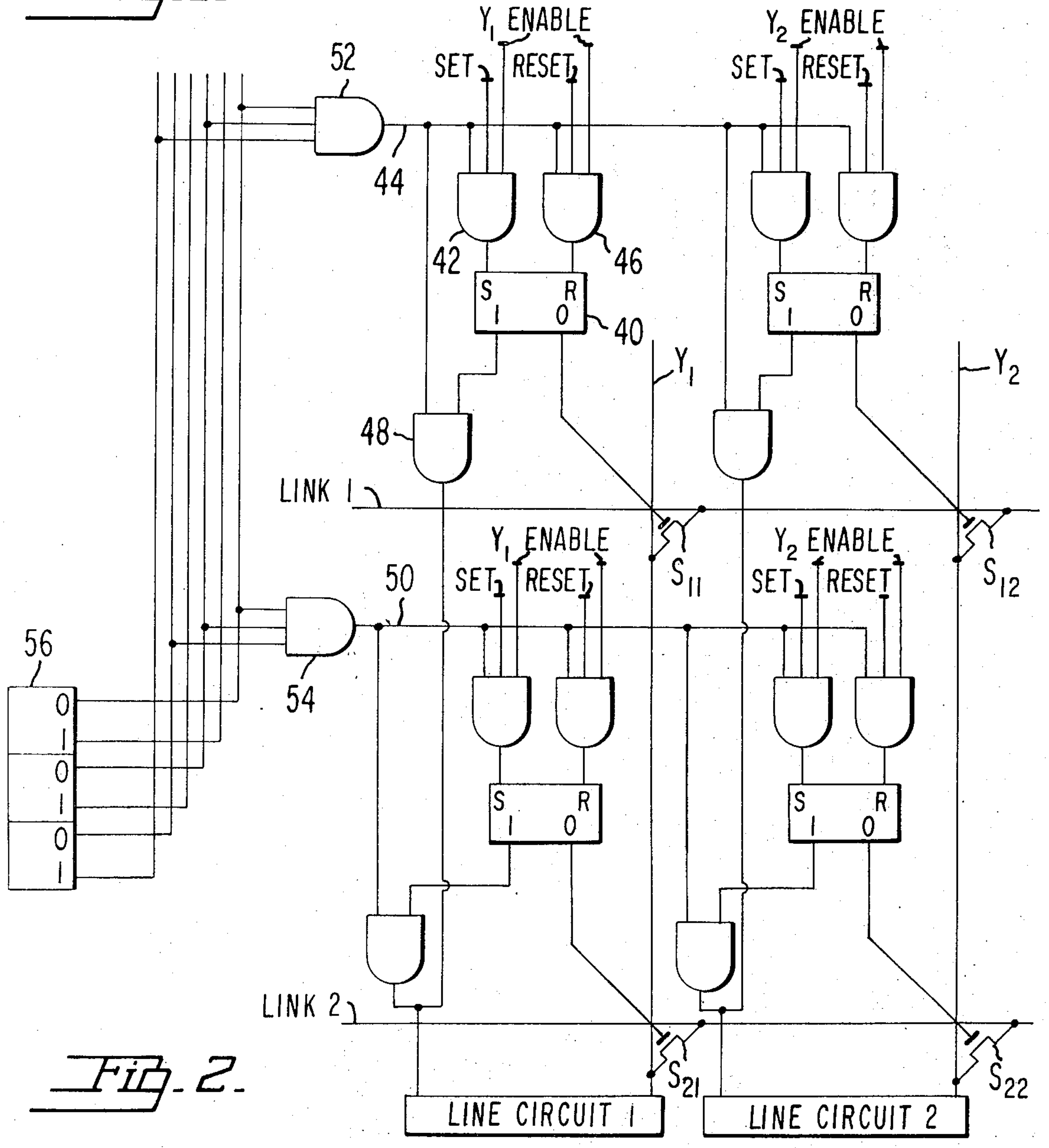

In the drawing:

FIG. 1 is a simplified block diagram of a preferred embodiment of the present invention; and FIG. 2 is a partial schematic and a partial block diagram demonstrating the manner in which strobing signals are developed in the embodiment of FIG. 1.

Referring to FIG. 1, only those parts of a PBX necessary to the explanation of the present invention are shown for the sake of clarity.

In FIG. 1, there is shown a common control 10. Common control 10 provides the necessary circuitry to control the desired switching functions within a switching matrix 12. Common control 10 is connected to the switching matrix 12 via lines 14, 16, 18 and 20 which are termed link address busses for reasons which will be more fully explained herein.

The switching matrix 12 is preferrably of the solid state variety, that is, where the crosspoint switches are solid state devices such as field-effect transistors and more particularly the transistors may preferrably be in integrated circuit form using MOS techniques.

Also, coupled to the switching matrix 12 are a plurality of utilization devices shown as line circuits 1, 2, 3 and n. Line circuits 1, 2, 3 and n are connected to switching matrix 12 via lines 22, 24, 26 and 28 respectively. Lines 22, 24, 26 and 28 are representative of an electrical connection between line circuits 1, 2, 3, and n and matrix 12. In actual practice each one of lines 22, 24, 26 and 28 may represent several conductors.

Control information buses 30, 32, 34 and 36 are provided as shown in FIG. 1. Bus 30 is the message complete line, bus 32 is the camp-on line, bus 34 is the disconnect line and bus 36 is an unspecified control signal M line representative of any other control information buses as desired, including coded information transfer buses where the particular information transferred at strobe time depends on the combination of lines in the group of buses which are activated.

Each of control information buses 30, 32, 34 and 36 have a connection to each of the line circuits 1, 2, 3 and n. Buses 30, 32, 34 and 36 present the paths over which the particular ones of line circuits 1, 2, 3 and n will transfer control signal information signals between each other as will be more fully explained herein.

In the system of FIG. 1, a link is defined as a conductive path through the switching matrix 12, say for example, in a rectangular matrix, a horizontal conduction path from one end of the switching matrix 12 to the other. Thus, there is a plurality of links in the matrix 12 of FIG. 1. It will be understood, however, that a link is more generally defined as a conduction path from end to end. Thus, in a more complex system where several switching matrices are staged together, the link may be complex and is not necessarily in a straight horizontal path from end to end.

In the operation of the embodiment shown in FIG. 1, the common control 10 will sequentially address the links in the switching matrix 12. However, addressing need not be sequential. For instance, a table of busy links could be used or any other rule which would insure that all busy paths are addressed. That is, in a time slot $t_1$ common control will generate a digital signal defining a particular link address and provide that digital signal to the switching matrix 12 over one of the link address buses 14, 16, 18 or 20.

If, for example, line circuits 1 and $n$ are both connected to the particular link addressed in time slot $t_1$, a strobing signal or pulse will be provided to line circuit 1 over path 22 and a strobing pulse will be provided to line circuit $n$ over path 28.

Line circuits 1 and $n$ respond to the strobing pulses by providing control information signaling. For example, if line circuit 1 has a message complete signal to transfer, it will put out the signal on message complete bus 30. Line circuit $n$, which also received a strobing signal will receive the message complete signal from bus 30 and will respond accordingly. Likewise, if line cricuit 1 has a disconnect signal to transfer, that signal will be coupled to bus 34 and line circuit $n$ will receive that signal from bus 34.

In the next link address time slot, $t_2$, common control 12 will address the next link in the sequence of links in the matrix 12 and the line circuits connected to that link at that time may then communicate control signals to each other over the information control buses 30, 32, 34 and 36.

Thus, it will be seen that any number of buses may be provided to accommodate any number of non-audio control information signals to be transferred from one line circuit to another.

Although FIG. 1 shows utilization devices in the form of line circuits 1, 2, 3 and $n$, the inventive concept may be used for the transfer of control information between other devices commonly found in a PBX such as registers to registers, line circuits to registers, trunk circuits to line circuits, etc. Hence, it will be understood that the utilization devices may be of any type desired or combination thereof.

From the foregoing it will be evident that the strobing pulses actually provide two functions. First, the strobing pulses indicate which ones of the line circuits 1, 2, 3 and n are connected to the particular link addressed by common control 10. Second, the strobing pulses tell those of line circuits 1, 2, 3 and $n$ which are connected to the particular link that the time is right for the transfer of control information signals from one line circuit to another.

Thus, it is evident that the transfer of control signals may be accomplished between any number or types of utilization devices which are connected to the particular link being addressed at a particular time, that is, at the particular link address time slot.

It should be noted, at this point, that the discussion thus far has been centered on the transfer of control information signals between utilization devices in a PBX. The audio paths of communication between subscribers (not shown), who are connected to the line circuits 1, 2, 3, and $n$ is assumed to have been made in the usual manner from one telephone, to a line circuit, through the matrix, to another line circuit and back to a second telephone.

The details of the manner in which the links are addressed and the manner in which strobing signals are provided is shown in FIG. 2 of the drawing.

FIG. 2 shows a two-by-two crosspoint switching matrix as exemplary of a much larger matrix. The matrix comprises vertical lines $Y_1$ and $Y_2$ and horizontal lines designated as link 1 and link 2. These links are illustrated as a single wire per link although in actual practice, they may be two, three, four or more per link. At each crosspoint, i.e., where a vertical path crosses over a horizontal path, there is a switching device shown as a field effect transistor each having two main electrodes and a control electrode. Each transistor switching device has one main electrode connected to a vertical path and the other main electrode connected to a horizontal or link path.

Transistor $S_{11}$ is connected between link 1 and vertical $Y_1$. Transistor $S_{12}$ is connected between link 1 and vertical $Y_2$. Transistor $S_{21}$ is connected between link 2 and vertical $Y_1$. Transistor $S_{22}$ is connected between link 2 and vertical $Y_2$.

Switches $S_{11}$, $S_{12}$, $S_{21}$ and $S_{22}$ may take many forms and may be fabricated by a variety of techniques. In FIG. 2, the transistorized switches $S_{11}$, $S_{12}$, $S_{21}$ and $S_{22}$ are field effect transistors fabricated in the P-MOS technique. In other applications, it may be desirable to use the N-MOS technique or discrete bipolar transistors or perhaps several devices paralleled at each crosspoint.

In FIG. 2, there is associated with each crosspoint switch a setting and readout means. The description that follows is given with respect to switch $S_{11}$ but the same circuitry is repeated for each of the other crosspoint switches $S_{12}$, $S_{21}$ and $S_{22}$.

The control electrode of switch $S_{11}$ is connected to the "0" output terminal of a flip-flop 40. The set terminal of flip-flop 40 is connected to the output terminal of AND gate 42. Gate 42 has three input terminals. One output terminal of AND gate 42 is connected to link 1 address bus 44. The second input terminal of gate 42 is connected to a source of SET commands (not shown) and the third input terminal of gate 42 is connected to a source of $Y_1$ ENABLE commands (not shown).

The reset terminal of flip-flop 40 is connected to the output terminal of another AND gate 46. Gate 46 has three input terminals which are respectively connected to: (a) link 1 address bus 44; (b) a source of RESET command signals (not shown); and (c) the source of $Y_1$ ENABLE commands (not shown).

There is also provided an AND gate 48 having two input terminals. One input terminal is connected to the "1" output terminal of flip-flop 40. The other input terminal of gate 48 is connected to link address bus 44. The output terminal of gate 48 is connected to line circuit 1.

The circuitry just described is identical for each crosspoint switch in FIG. 2 with the following exceptions. With respect to switch $S_{12}$, the gates corresponding to gates 42 and 46 have $Y_2$ enable input terminals and the output terminal of the gate corresponding to gate 48 is connected to line circuit 2. With respect to switch $S_{21}$, the gates corresponding to gates 42 and 46 have input terminals connected to line address 2 bus 50 and the gate corresponding to gate 48 has an input terminal connected to bus 50. With respect to switch $S_{22}$, the gates corresponding to gates 42 and 46 each have input terminals connected to bus 50 and to the $Y_2$ ENABLE command source and the gate corresponding to gate 48 has an input terminal connected to bus 50 and an output terminal connected to line circuit 2.

In addition, the vertical matrix paths $Y_1$ and $Y_2$ are respectively connected to line circuits 1 and 2.

Also, in FIG. 2 there is provided a link 1 address gate 52 whose output terminal is connected to bus 44 and link 2 address gate 54 whose output terminal is connected to bus 50.

A link address scanner in the form of counter 56 is also provided. The output of counter 56 is divided into three sections, each section having a "1" and a "0" output terminal. Counter 56 is driven by a clock (not shown) and sequentially provides link address signals in digital form. The input terminals of link address gates 52 and 54 are connected to the output terminals of counter 56 such that when counter 56 reads out the particular link address associated with a certain link address gate, the gate is enabled.

As an example, the digital address for gate 52 is 001. The first input terminal of gate 52 is connected to the 0 output terminal of the first section of counter 56. The second input terminal of gate 52 is connected to the 0 output terminal of the second section of counter 56 and the third input terminal of gate 52 is connected to the 1 output terminal of the third section of counter 56.

When the counter 56 reads out a signal of 001, gate 52 is enabled and a signal appears on link 1 address bus 44. Likewise, as the counter steps through its sequence of numbers, the other links in the switching matrix will be sequentially addressed in a similar manner.

The operation of the circuitry of FIG. 2 is as follows. Assume that the counter 56 has addressed link 1 and therefore gate 52 is enabled and a signal appears on bus 44. Further assume that at this time the SET command source and the $Y_1$ and $Y_2$ ENABLE sources are providing appropriate signals. Since gate 42, related to switch $S_{11}$, and the corresponding gate for switch $S_{12}$ have been enabled by the aforementioned signals, the flip-flops 40, related respectively to switches $S_{11}$ and $S_{12}$, will turn on or remain on depending upon their previous condition of conduction. Since the switches $S_{11}$ and $S_{12}$ are P-MOS devices, they need a low signal or a "0" at the gate electrodes thereof for conduction.

At this same time, the gates 48 associated with switches $S_{11}$ and $S_{22}$ are enabled since they have received a high input or a "1" from the flip-flops 40 to one input terminal and a high or "1" signal from bus 44 at the other input terminal thereof respectively.

Thus, the gates 48 associated with switches $S_{11}$ and $S_{22}$ deliver, from their output terminals, strobing pulses to line circuits 1 and 2 respectively.

Line circuits 1 and 2 now have an indication that at the link 1 address time slot they are respectively connected to link 1. In addition, line circuits 1 and 2 may now transfer control information signals over buses 30, 32, 34 and 36 as described with respect to FIG. 1.

In the next link address time slot the counter 56 will address the next link in sequence and the procedure described above will continue as counter 56 steps through each of the links in matrix 12.

Hence, the elements shown in FIG. 2 provide a means by which the links in the matrix 12 may be addressed, the switches $S_{11}$, $S_{12}$, $S_{21}$ and $S_{22}$ may be set and reset, and in addition provides a means for delivering strobing signals to particular ones of line circuits 1, 2, 3 and n which are connected to a particular link during the particular link time slot.

What is claimed is:

1. In a private branch exchange, a system for transferring non-verbal information signals, said system comprising:

a crosspoint switching matrix having a plurality of crosspoint switches, said switches being selectively controllable for providing a low impedance signal path, certain ones of said switches being connected to particular links in a plurality of links through said matrix;

a plurality of utilization devices coupled to said switching matrix;

at least one information bus external to said switching matrix and having a connection to each of said utilization devices;

means for selectively addressing said plurality of links and for providing a link address signal at the time a given link is addressed;

a plurality of switch indicator means, each one being coupled to a corresponding one of said plurality of switches and each being responsive to the low impedance signal path condition of the corresponding switch for providing a switch indicator signal;

a plurality of signal gating devices, each one of said gating devices being coupled to a corresponding one of said plurality of switch indicator means, each one of said gating devices being responsive to the corresponding switch indicator signal and to the link address signal associated with the link to which said corresponding one of said switches is connected for providing a strobing signal to a certain one of said plurality of utilization devices;

at least some of said certain ones of said utilization devices transferring non-verbal information signals from one to another over said at least one information bus in response to said strobing signals.

2. The system according to claim 1 wherein said crosspoint switching matrix includes a plurality of semiconductor devices each having a pair of main electrodes and a control electrode, at least one of said semiconductor devices being located at each crosspoint of said matrix.

3. The system according to claim 2 wherein said utilization devices comprise line circuits.

4. In a private branch exchange, a system for transferring a plurality of non-verbal control information signals, said system comprising:

a crosspoint switching matrix, having a plurality of crosspoint switches, said switches being selectively controllable for providing a low impedance signal path, certain ones of said switches being connected to particular links in a plurality of links through said matrix;

a plurality of utilization devices coupled to said switching matrix;

a plurality of control information buses, one for each of said plurality of control information signals, each bus being external to said switching matrix, each control information bus having a connection to each of said utilization devices;

means for selectively addressing said plurality of links and for providing a digital link address signal at the time a particular link is being addressed;

a plurality of switch indicator means, each one being coupled to a corresponding one of said plurality of switches and each providing a corresponding digital switch indicator signal for indicating the existence of a low impedance signal path condition in the associated switch;

a plurality of gate circuits, each one being associated with a corresponding switch indicator means, each gate circuit further having an output terminal connected to a corresponding one of said plurality of utilization devices, each gate circuit being responsive to the corresponding digital switch indicator signal and to the digital link address signal associated with the link to which said corresponding one of said switches is connected for providing a strobing signal to said corresponding one of said utilization devices;

said corresponding ones of said utilization devices transferring non-verbal information signals from one to another over at least one of said plurality of information buses in response to said strobing signals provided thereto.

5. The system according to claim 4 wherein said crosspoint switches comprise semiconductor devices each having first and second main electrodes and a control electrode, one main electrode of each semiconductor device in said certain ones of said switches being connected to said particular links.

6. The system according to claim 5 wherein said semiconductor device is an insulated gate field effect transistor.

7. The system according to claim 6 wherein said utilization circuits comprise line circuits.

8. The system according to claim 7 wherein said means for addressing said links comprises a digital counter circuit operatively coupled to a plurality of link address gates, said link address gates providing said link address signal at said particular time.

9. In a private branch exchange, a system for transferring several types of non-verbal control information signals, said system comprising:

a switching matrix comprising a plurality of solid state crosspoint switches, each of said switches being selectively controllable for providing a low impedance signal path, certain ones of said crosspoint switches being connected to particular links in a plurality of links through said matrix;

a plurality of utilization devices coupled to said switching matrix;

a plurality of control information buses, one for each of said several types of control signals, each bus being external to said switching matrix, each control information bus having a connection to each of said utilization devices;

a plurality of crosspoint condition indicating means, each one being coupled to a corresponding crosspoint switch, each one comprising a flip-flop circuit having two stable states, one stable state indicating a low impedance switch condition;

means for selectively addressing said links and for providing a link address signal at the time a particular link is addressed;

a plurality of AND gates, one for each flip-flop circuit, each of said gates having a pair of input terminals and an output terminal, one input terminal of each gate being connected in circuit with a corresponding flip-flop circuit, the other input terminal of each gate being connected to said link addressing means, the output terminal of each gate being connected to one of said utilization devices, each of said gates being responsive to said one stable state of the corresponding flip-flop circuit and the link address signal associated with said corresponding flip-flop circuit for providing a strobing signal to the utilization device connected thereto;

at least one type of control information signal being transferred over the corresponding control information bus from one utilization device having a strobing signal applied thereto to another utilization device having a strobing signal applied thereto.

10. The system according to claim 9 wherein said means for addressing said links comprises a digital counter circuit operatively coupled to a plurality of link address gates, each one of said link address gates being associated with a different one of said plurality of links and each one of said link address gates providing said link address signal at a time corresponding to the time the associated link is addressed.

* * * * *